United States Patent Office 3,063,840
Patented Nov. 13, 1962

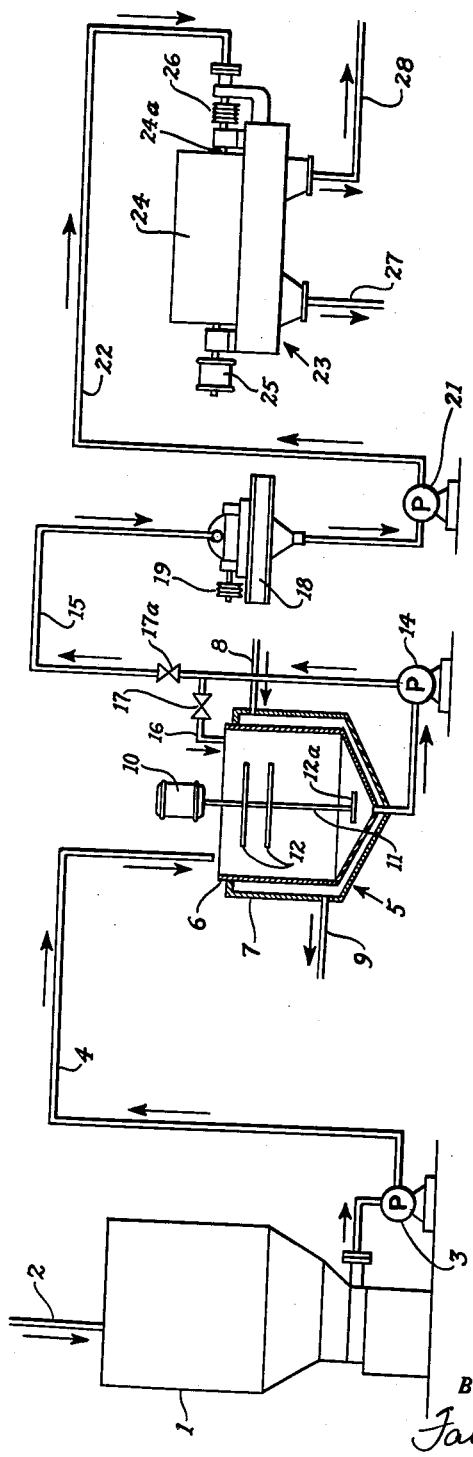

3,063,840
RECOVERY OF EDIBLE PROTEIN FROM FATTY ANIMAL STOCK
Frank E. Sullivan, Poughkeepsie, N.Y., assignor to The De Laval Separator Company, Poughkeepsie, N.Y., a corporation of New Jersey
Filed July 12, 1960, Ser. No. 42,316
5 Claims. (Cl. 99—18)

This invention relates to the treatment of fatty animal stock to recover an edible protein product, such as a product suitable for sausage. More particularly, the invention has reference to an improved continuous method for recovering edible protein from fatty animal stock.

A by-product of meat packing plants is the fatty animal stock commonly used for producing lard and edible protein products. The protein content of such stock is small, often less than 2%, and is largely in the form of proteinaceous tissue encased in fat which should be stripped from the tissue for effective processing of the stock. The stock contains a high proportion of fat, which is well over 50% and may be as high as 90% or more. For example, a typical starting material from hogs is a mixture of ham, back, plate fats and loin trim, containing only 1.6% of protein and about 90% fat. An edible protein product from such material should contain no more than 50% fat.

In the processing of such fatty animal stock, it has been common practice heretofore to grind the stock and then heat it in an open tank to a temperature of 160–180° F., the purpose of this high-temperature heating being to strip fat from the proteinaceous tissue so that the fat can be recovered relatively free of protein and the protein content can be recovered in more concentrated form. The heat-stripped stock is then fed to a centrifugal separator where it is separated into relatively heavy and light components which are, respectively, a product relatively high in protein and a product of reduced protein content and high fat content which may be further processed to produce lard. This prior method leaves much to be desired, particularly because a substantial part of the protein content in the feed material is not recovered in the protein product, and because the high temperature required for the stripping has an adverse effect on the protein product which makes it unsuitable for human consumption.

The principal object of the present invention is to provide a continuous process of the character described for producing an edible protein product which contains substantially all of the protein in the feed material and which has a fat content no greater than 50%.

According to the new method, the fatty stock is subjected to a grinding operation and is then fed continuously to a heating zone where it is heated to a temperature of about 100° F. by heat exchange through a wall of this zone. Thus, the heating of the stock is to a temperature considerably lower than the stripping temperature heretofore used. From the heating zone, the stock passes continuously to a mechanical disintegrating zone where the stock is comminuted and a mechanical stripping of fat from the proteinaceous tissue is effected. Due to the heat of friction incident to the mechanical disintegrating action, the stock is further heated to a temperature not in excess of 115° F. From the disintegrating zone, the mechanically stripped and comminuted stock is fed at substantially the above-noted higher temperature to a locus of centrifugal force and is there continuously separated into a relatively heavy component of edible protein containing less than 50% fat and a relatively light component containing at least 90% fat, these components being discharged separately from the centrifugal locus.

In the preferred practice of the invention, the grinding operation includes the step of forcing the stock through holes substantially ⅛ inch in diameter, and the comminuting and mechanical stripping operation includes the step of forcing the stock through a screen having substantially square perforations each side of which is at least ⅛ of an inch but substantially less than ¼ of an inch. In this way, it has been found possible to recover 75 to 77% of the available protein of the feed in the edible protein product discharged from the centrifugal locus, when the feed contains only 1.4% protein.

For a better understanding of the invention, reference may be had to the accompanying drawing in which the single illustration is a schematic view of a preferred form of apparatus for carrying out the new method.

Referring to the drawing, the reference numeral 1 designates a grinder, which may be a conventional sausage grinder of the well-known type having a plate provided with a series of holes through which the feed material is pressed. An example of such a grinder is an Allbright-Nell grinder operating at 200 r.p.m. The feed material or fatty animal stock is supplied to the grinder 1 through a feed line 2.

The ground fatty material passes from grinder 1 to a pump 3 which pumps it through a pipe 4 to a heating tank 5. The latter comprises an inner vessel 6 and an outer jacket 7 forming an interspace for the heating medium, which may be steam supplied by a pipe 8. The condensate resulting from the heating operation is discharged from the jacket space through a pipe 9. It will be apparent, therefore, that the part 5 forms a heating zone in which the ground fatty material is heated by heat exchange through the wall 6 of this zone. The supply of steam to the jacket of heater 6—7 is controlled to heat the fatty material to a temperature of about 100° F. During the heating, the mass is agitated by means comprising a motor 10 which drives a vertical shaft extending downward into the central portion of the vessel 6, this shaft carrying agitator blades 12—12a. In this way, local overheating of the fatty material is prevented, and settling of any part of the material is avoided while it is being heated uniformly to the required temperature.

The heated material passes from the bottom of the heating vessel 6 to a pump 14 which delivers it under pressure to a pipe 15. A return line 16 having a valve 17 leads from pipe 15 back to the heating vessel 6 to provide for constant recirculation of part of the heated material. When starting the system in operation, a valve 17a in pipe 15 may be closed so that all of the material is recirculated by pump 14 to the heating vessel 6 until the material is brought up to a temperature of about 100° F., whereupon the valve 17a is opened so that only part of the material is so recirculated.

The pipe 15 leads to a mechanical disintegrating zone indicated generally at 18 where the material is further heated to a temperature no greater than 115° F. by the heat of friction incident to the mechanical disintegrating action. The disintegrating action is of a nature which comminutes the fatty stock while mechanically stripping fat from its proteinaceous tissue. The zone 18 is formed by a disintegrator tof the type having a series of blades rotated at high speed by a motor-driven pulley 19, and a perforated screen through which the material is forced under pressure. An example of this type of disintegrator which has been found to give good results is the "Fitzmill Therminuter," Model K-14, sold by W. J. Fitzpatrick Company, having 32 blades of the Special Emulsor Type. The extent to which the material is further heated in this mechanical disintegrator depends upon the speed at which the blades are rotated and the size of the perforations in the screen. For example, when using at ¼ inch striated screen in the "Fitzmill Therminuter" and an operating speed of 2200 r.p.m., the temperature of the fatty stock was found to increase 8 to 10° F. at a certain throughput rate (substantially full capacity), whereas the temperature increase with the same screen and throughput rate but with an operating speed of 3600 r.p.m. was found to be from 6 to 7° F. With a 5/32 inch perforated screen, an operating speed of 3600 r.p.m. and the same throughput rate, the temperature increase of the material passing through the "Fitzmill Therminuter" was found to be from 17 to 20° F. I have found that the latter screen gives the best results in mechanically liberating fat from the protein cell tissue, thereby enabling a better recovery of protein in the final edible protein product and providing such a product having a fat content of 50% or less.

The finally heated material from the mechanical disintegrating zone 18 passes through a pump 21 and pipe 22 to a centrifugal separator 23. This separator, as shown, is of the type known as a "desludger" comprising a centrifugal bowl 24 mounted for rotation on a horizontal axis and into which the material is fed by a central feed tube 24a to which the supply pipe 22 leads, the bowl containing a screw or scroll (not shown) mounted for rotation on the bowl axis and driven at a different speed than the bowl so as to effect discharge of the separated heavier component or sludge. Thus, the centrifugal separator 23 is shown provided with two drive pulleys 25 and 26, one for driving the bowl 24 and the other for driving the discharge screw or scroll at a different speed. An example of a centrifugal separator of this type which has been found to give good results in a De Laval NX-210 Desludger sold by the De Laval Separator Company and operating at a bowl speed of 1450 r.p.m. and a scroll speed of 1428 r.p.m.

The centrifugal separator 23 forms a locus of centrifugal force in which the mechanically stripped fatty animal stock, heated to a temperature of substantially 115° F. but not in excess of this temperature, is separated into a relatively heavy component of edible protein containing no more than 50% fat and a relatively light component containing at least 90% fat. The heavier component or edible protein product is continuously discharged through an outlet pipe 27 leading from the separator, while the lighter component is continuously discharged from the separator into a pipe 28, which may lead to conventional apparatus (not shown) for further treatment of this fat component to produce lard.

As an example of the practice of the new method with the apparatus illustrated, the feed through pipe 2 to the grinder 1 is a mixture of ham, back, plate fats and loin trim, which mixture contains 91% fat, 1.5% protein and 7.5% water, by weight. The edible protein product discharged through the outlet pipe 27 of centrifugal separator 23 contains 46% fat, 12% protein and 42% water, this being a meat equivalent suitable for sausage stuffing. The lighter or fat component discharged from centrifugal separtaor 23 through pipe 28 contains about 95% fat and about 0.4% protein, the balance being essentially water. Approximately 75% of the edible protein in the feed to the grinder 1 is recovered in the edible protein product discharged from centrifugal separator 23 through outlet pipe 27. In this example, the mechanical disintegrating zone 18 was provided by the "Fitzmill Therminuter" previously described, and the locus 23 of centrifugal force was provided by the De Laval Desludger previously described.

For best results, the ground stock should be heated in the heating vessel 6 to a temperature (about 100° F.) such that the further heating of the material in the mechanical disintegrating zone 18 will bring the material to a temperature close to but not exceeding 115° F., preferably 114° F. Also, the holes in the perforated plate (not shown) of the sausage grinder 1 should have a diameter of about 1/8 inch, and the screen used in the "Fitzmill Therminuter" forming the mechanical disintegrating zone 18 should have substantially square perforations each side of which is at least 1/8 inch but substantially less than 1/4 inch. In the example previously described, the plate holes in grinder 1 were of the above-noted diameter, and the "Fitzmill Therminuter" was operated at 3600 r.p.m. at substatnially full capacity with a 5/32 inch screen, the ground stock being heated in the heating zone 5 to a temperature of 95° F.

I claim:
1. In the recovery of edible protein from fatty animal stock containing a major proportion of fat and a minor proportion of proteinaceous tissue encased in fat, the method which comprises grinding the fatty stock, feeding the ground stock continuously to a heating zone and there heating it to a temperature of about 100° F. by heat exchange through a wall of said zone, passing heated stock continuously from said zone to a mechanical disintegrating zone and there comminuting the stock and mechanically stripping fat from said tissue while further heating the stock, through heat of friction created by the disintegrating action on the stock, to a higher temperature not in excess of 115° F., continuously feeding stripped and comminuted stock at substantially said higher temperature from the disintegrating zone to a locus of centrifugal force and there continuously separating the stock into a relatively heavy component of edible protein containing no more than 50% fat and a relatively light component containing at least 90% fat, and discharging said components separately from the centrifugal locus.

2. A method according to claim 1, in which said separated components are continuously discharged from the centrifugal locus.

3. A method according to claim 1, in which said grinding includes the step of forcing the stock through perforations substantially 1/8 of an inch in diameter.

4. A method according to claim 1, in which said comminuting and mechanical stripping include the step of forcing the stock through a screen having substantially square perforations each side of which is at least 1/8 of an inch but substantially less than 1/4 of an inch.

5. A method according to claim 1, in which said grinding includes the step of forcing the stock through perforations substantially 1/8 of an inch in diameter, said comminuting and mechanical stripping including the step of forcing the stock through a screen having substantially square perforiatons each side of which is at least 1/8 of an inch but substantially less than 1/4 of an inch.

References Cited in the file of this patent

UNITED STATES PATENTS

| | | |
|---|---|---|
| 254,279 | Cosine | Feb. 28, 1882 |
| 1,760,059 | Hiller | May 27, 1930 |
| 2,823,215 | Downing | Feb. 11, 1958 |